DEPOSITORY MACHINE COMBINED WITH IMAGE RECORDING MEANS

Filed Nov. 19, 1962 7 Sheets-Sheet 1

LUTHER G. SIMJIAN
INVENTOR
BY
ATTORNEY

DEPOSITORY MACHINE COMBINED WITH IMAGE RECORDING MEANS

Filed Nov. 19, 1962 7 Sheets-Sheet 2

LUTHER G. SIMJIAN
INVENTOR
BY
ATTORNEY

DEPOSITORY MACHINE COMBINED WITH IMAGE RECORDING MEANS

Filed Nov. 19, 1962 7 Sheets-Sheet 3

LUTHER G. SIMJIAN
INVENTOR

BY [signature]
ATTORNEY

LUTHER G. SIMJIAN
INVENTOR
BY
ATTORNEY

DEPOSITORY MACHINE COMBINED WITH IMAGE RECORDING MEANS

LUTHER G. SIMJIAN
INVENTOR

BY

ATTORNEY

Sept. 29, 1964 L. G. SIMJIAN 3,150,912

DEPOSITORY MACHINE COMBINED WITH IMAGE RECORDING MEANS

Filed Nov. 19, 1962 7 Sheets-Sheet 6

LUTHER G. SIMJIAN
INVENTOR

BY [signature]

ATTORNEY

LUTHER G. SIMJIAN
INVENTOR
BY
ATTORNEY 3,150,912

DEPOSITORY MACHINE COMBINED WITH IMAGE RECORDING MEANS

Luther G. Simjian, Greenwich, Conn., assignor to Universal Match Corporation, Ferguson, Mo., a corporation of Delaware Filed Nov. 19, 1962, Ser. No. 238,654
18 Claims. (Cl. 346—22)

This invention relates to depository machines, and more particularly, to depository machines having automatic image recording and receipt providing means.

A machine embodying this invention is particularly useful as a bank depository machine or mechanical bank teller in that it is adapted to receive a deposit of various items including money bills, checks, and one or more itemized deposit tags or tally slips; to make an independent record of each item deposited; to validate and return, if desired, one deposit tag as a receipt of the transaction; and to store the remaining items safe from surreptitious removal.

The instant invention includes several features disclosed in my copending application for United States Letters Patent entitled "Depository Machine Combined With Image Recording Means," Serial Number 187,511, filed April 16, 1962; to which reference may be had for structure not herein disclosed.

Another type of machine is disclosed in my copending application for United States Letters Patent entitled "Depository Machine Combined With Image Recording Means," Serial Number 30,312, filed May 19, 1960, now Patent No. 3,076,965.

The machine shown in Serial No. 187,511 is well suited to its function as a bank depository machine. In its preferred method of operation, a pair of deposit tags are first inserted into the machine which validates each deposit tag, photographs one of the tags, and then permits the insertion of the other deposit items such as money bills and checks. These money bills and checks must be inserted sequentially into the machine, wherein they are individually photographed in conjunction with a portion of one deposit tag. Subsequent to the last document item of the deposit being deposited, the photographically recorded items are stored away, while the other deposit tag is photographed and returned to the depositor as a receipt.

When a deposit includes a large number of document items, particularly many money bills, the sequential insertion of the document items by the depositor may be taxing of the depositor's time and manual dexterity.

It is, therefore, an object of this invention to provide a depository machine, wherein at least certain of the document items of the deposit may be inserted concurrently in a bulk fashion.

The machine shown in Serial No. 30,312 shows an arrangement wherein all of the document items of the deposit are placed in an envelope or similar wrapper which is inserted into the machine. The machine automatically feeds the items sequentially out of the envelope for photographic recording. The envelope may also be validated, photographed and returned as a receipt. This arrangement, however, presupposes that the document items of deposit are within an envelope prior to acceptance by the machine.

It is an object of this invention to provide a depository machine wherein document items of the deposit are inserted concurrently in a bulk fashion and are recorded in sequence, item by item.

Another and primary object of this invention is to provide a depository machine wherein certain of the document items of the deposit are inserted concurrently in a bulk fashion or a stack, and are each recorded without breaking this bulk or stack.

Another object of this invention is to provide a depository machine wherein certain of the document items of the deposit are inserted concurrently in a bulk fashion and are each recorded in conjunction with another item of deposit.

A feature of this invention is the provision of image recording means; means for receiving a plurality of documents in a stack and disposing the stack in view of the recording means; means for engaging the stack and for sequentially exposing a portion of each of the documents in the stack while the documents are held in the stack; and control means coupled to said recording means and said engaging means to record an image of the exposed portion of each of the documents.

Other objects and features of this invention will be apparent by reference to the following specification when read in conjunction with the accompanying drawings in which.

Figure 1:
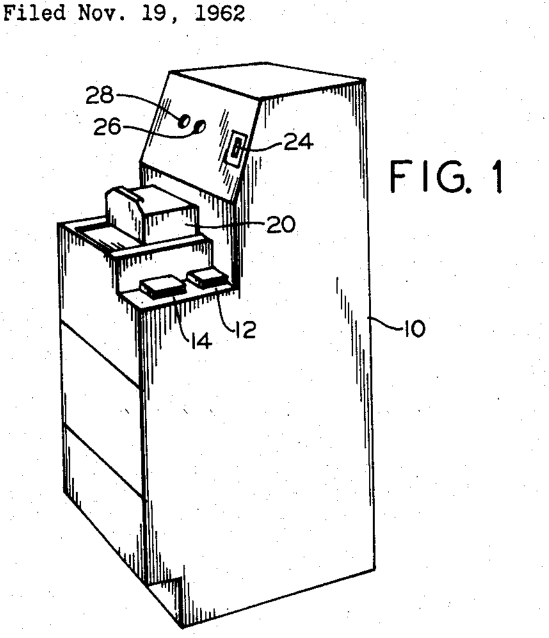
FIGURE 1 is a perspective view of a machine embodying this invention.

Turning now to the drawings, the machine embodying this invention includes an enclosure 10 having a pair of apertures 12 and 14 for receiving a pair of deposit tags 16 and 18 respectively, and a drawer or tray 20 for receiving a stack 22 of documents, here shown to be money bills. The machine is also provided with a coin receiving chute 24 and a pair of indicator lights 26 and 28.

Figure 2:
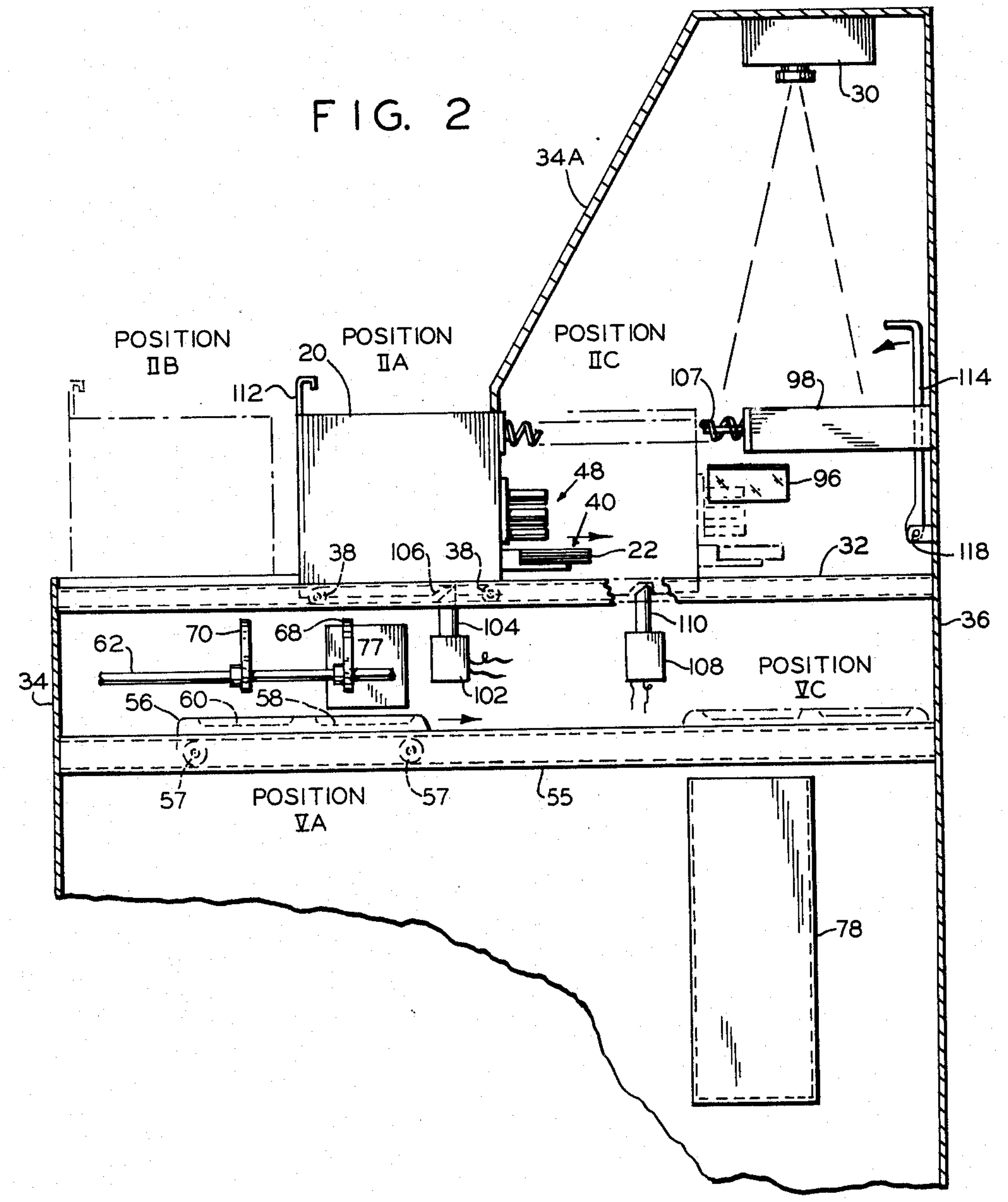
FIGURE 2 is a side elevation view in cross section of the machine of FIGURE 1 showing the relative positions of the several document carrying means and the image recording means.

An image recording means shown in FIGURE 2 as a photographic camera 30, is fixed to the inside top of the enclosure. A pair of guide rails 32 are fixed from the front wall 34 to the rear wall 36 of the machine. The drawer 20 is provided with suitable rollers 38 which engage the guide rails and guide the tray from its normal position IIA, shown in FIGURE 2 in heavy lines, through its load position IIB and its turning-record position IIC, both shown in dotted lines.

Mounted to the rear of the drawer 20 is a stack clamp 40, also shown in FIGURE 7, which includes a base member 42 which is biased upwardly, and a top member 44 which is pivotally mounted at 46 to the base member and is movable between a stack hold position (shown in heavy lines) and a stack release position (shown in dotted lines) by suitable linkage which may be operated by a depositor. Also mounted to the rear of the tray above the stack clamp 40 is a document turning device 48. The turning device includes a turret base 50 and five tubular upstanding projections 52A, 52B, 52C, 52D and 52E mounted thereon in a circle. Each of the projections has a small orifice 54A, 54B, 54C, 54D and 54E respectively, disposable tangentially to the outer periphery of the turret base. As will be described hereinafter, the drawer 20 may be pulled by a depositor from its normal position IIA to its load position IIB. In this position the stack clamp 40 and the document turning device 48 are exposed to the depositor. The depositor may insert a stack of deposit items in the stack clamp 40 which is biased upwardly into cooperative relationship with the turning device 48 as shown in FIGURE 7. The depositor may push the drawer 20 into the enclosure and into its rearwardmost or turning and record position IIC, in which position the stack of deposit items will be in the view of the camera 30. The document turning device 48 is rotatably mounted to the rear of the drawer 20 and the turret base is connected to a pneumatic vacuum source. The device is of the type manufactured by De La Rue Instruments Limited of 168/172 Old Street, London E.C. 1, England; and is incorporated in their "(100) type checking and counting machine." This device is adapted to sequentially engage each document in the stack and turn it, as will be hereinafter described.

Figure 3:
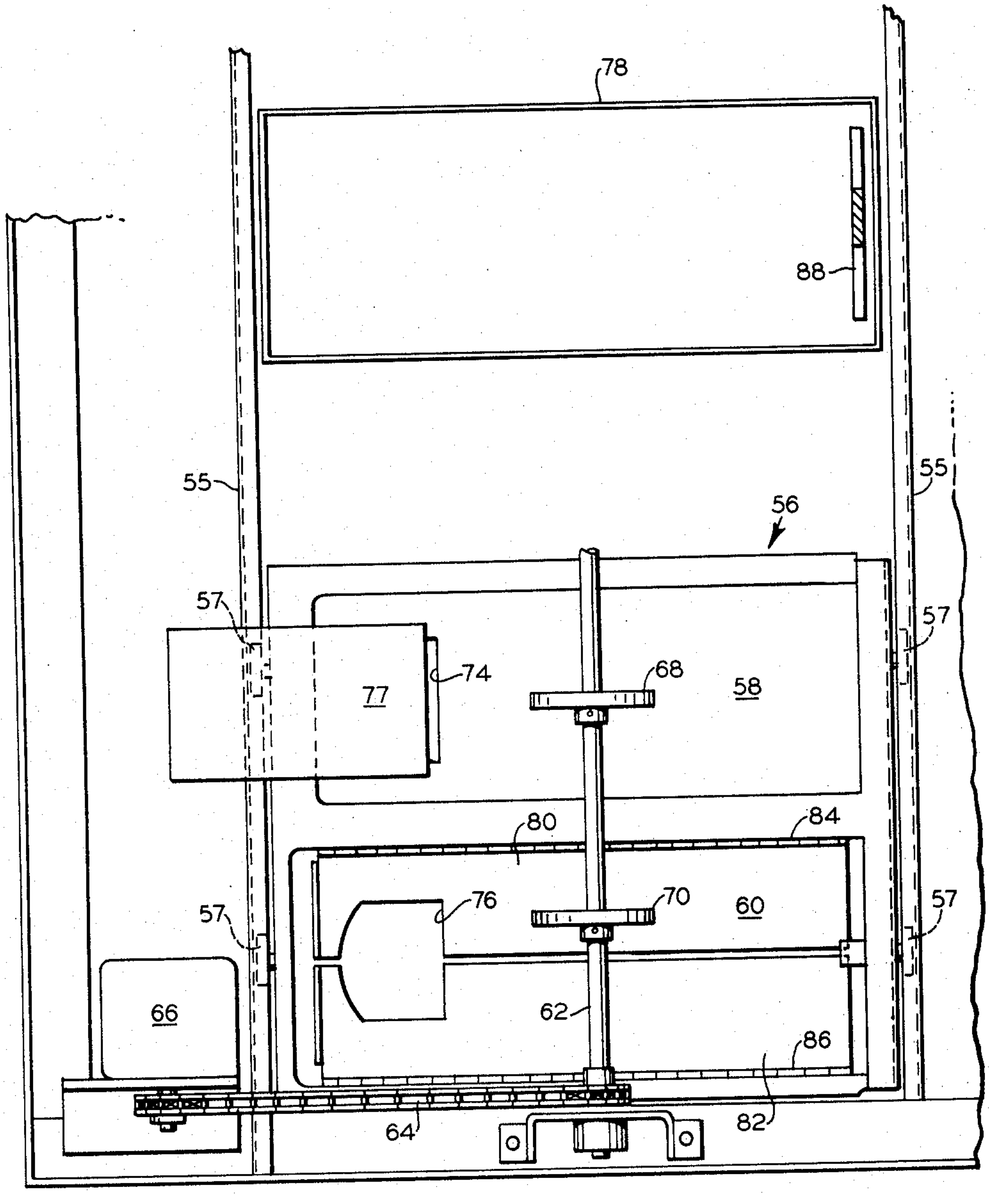
FIGURE 3 is a top view of the deposit tag receiving tray of FIGURE 2.

A second pair of guide rails 55 are fixed between the enclosure front wall 34 and rear wall 36 below the guide rails 30. A deposit tag receiving tray 56, has suitable guide rollers 57 which engage the guide rails 55, and is disposed to move from a load position VA (shown in heavy lines in FIGURE 2), which is adjacent apertures 12 and 14, through an intermediate position VB, to its rearwardmost record position VC. As seen in FIGURES 2, 3 and 5, the tray 56 has two tag receiving depressions 58 and 60. When the tray is in the VA position the depression 58 is adjacent the aperture 12 and the depression 60 is adjacent the aperture 14. A shaft 62 is journaled over the tray 56 in its VA position, and is coupled, for example by a chain drive 64, to a bidirectional motor 66. Fixed to the shaft 62 are a pair of eccentric friction discs 68 and 70. The disc 68 is disposed above the depression 58 and the disc 70 is disposed above the depression 60. As will be hereinafter described, when the pair of deposit tags 16 and 18 are inserted through respective apertures 12 and 14, they pass at least partially into the respective depressions 58 and 60. When the presence of both tags is sensed, the motor 66 is energized to clockwise rotate the discs 68 and 70, which engage and kick the tags fully into the depressions 58 and 60.

Figure 4:
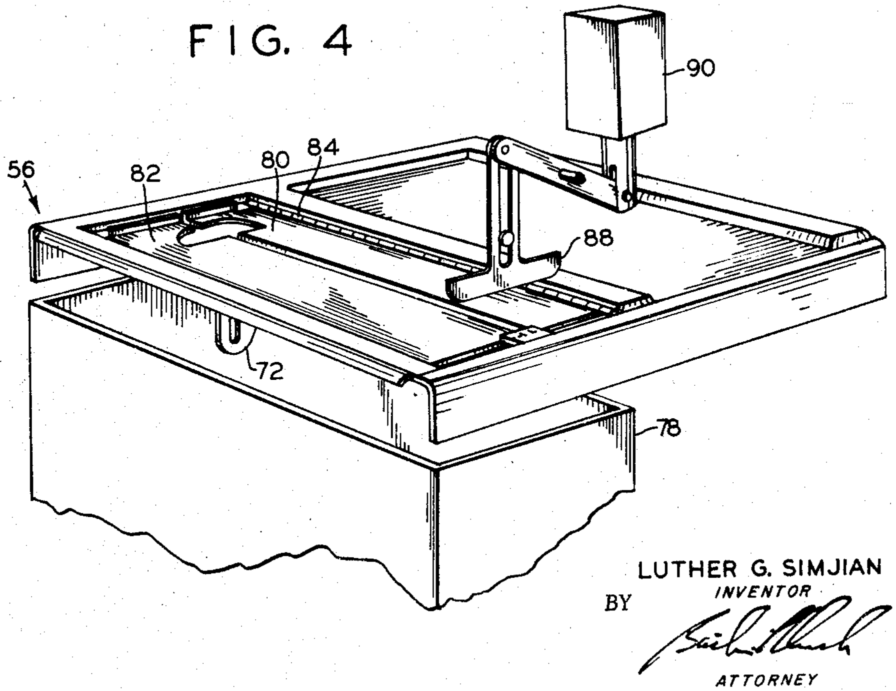
FIGURE 4 is a perspective view of the deposit tag receiving tray showing the structure for dumping documents into the storage box.

A slotted bracket 72, as seen in FIGURE 4, is fixed to the underside of the tray 56 for engagement with a pin on a motor driven chain drive to reciprocate the tray through its several positions, substantially as is shown in Serial No. 187,511, FIGURES 8 through 11.

The depressions 58 and 60 have a respective cut-out 74 and 76. When the tray 56 is in the VA position the cut-out 74 is located directly under a validating mechanism 77. When energized, an anvil (not shown) rises to support the tag through the cut-out 74 against the impact of the validating mechanism 77 which descends against the tag 16 above the cut-out 74. This arrangement is identical to that shown in Serial No. 187,511. When the tray is moved to its intermediate position VB, the validating mechanism 77 is disposed above the cut-out 76 of the depression 60, and, when energized, will validate the tag 18.

When the tray 56 is moved to its rearwardmost or record position VC, the depression 60 is directly above the open upper end of a storage box 78. This arrangement is similar to that shown in Serial No. 187,511. The bottom of the tag receiving depression 60 is formed by two flaps 80 and 82 which are each hinged, at 84 and 86 respectively, to the main body of the tray, and biased upwards. In the record position VC, as shown in FIGURE 4, the flaps 80 and 82 are disposed below a plunger 88 which is coupled by a crank arm to a solenoid 90. When the solenoid 90 is energized, the plunger 88 abuts and pivots the flaps 80 and 82 downwardly, dumping any documents in the depression 60 into the storage box 78.

Figure 7A:
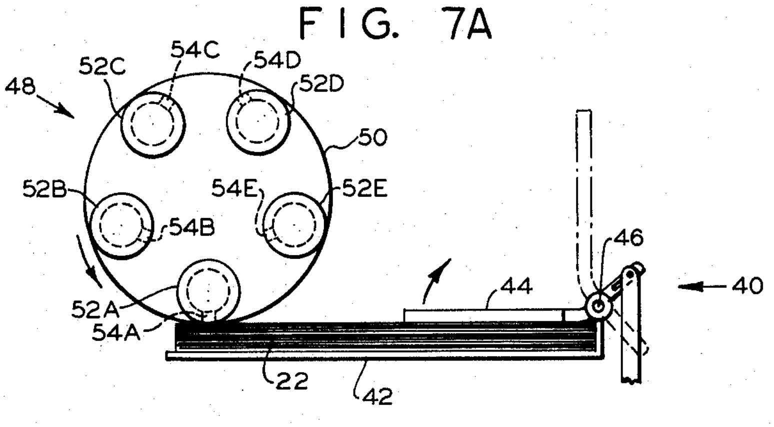
FIGURES 7A, 7B, 7C, 7D and 7E are an operation sequence strip showing several positions of the document turning device.
Figures 7B, 7C, 7D:
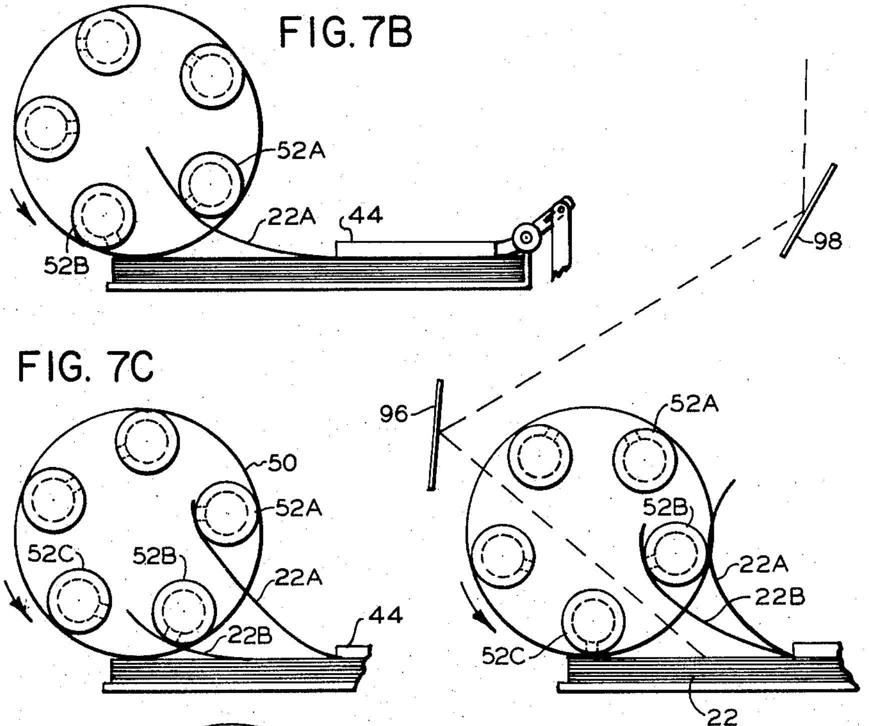
Figure 7E:
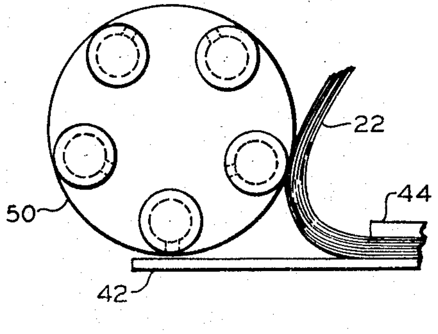
Figure 8A:
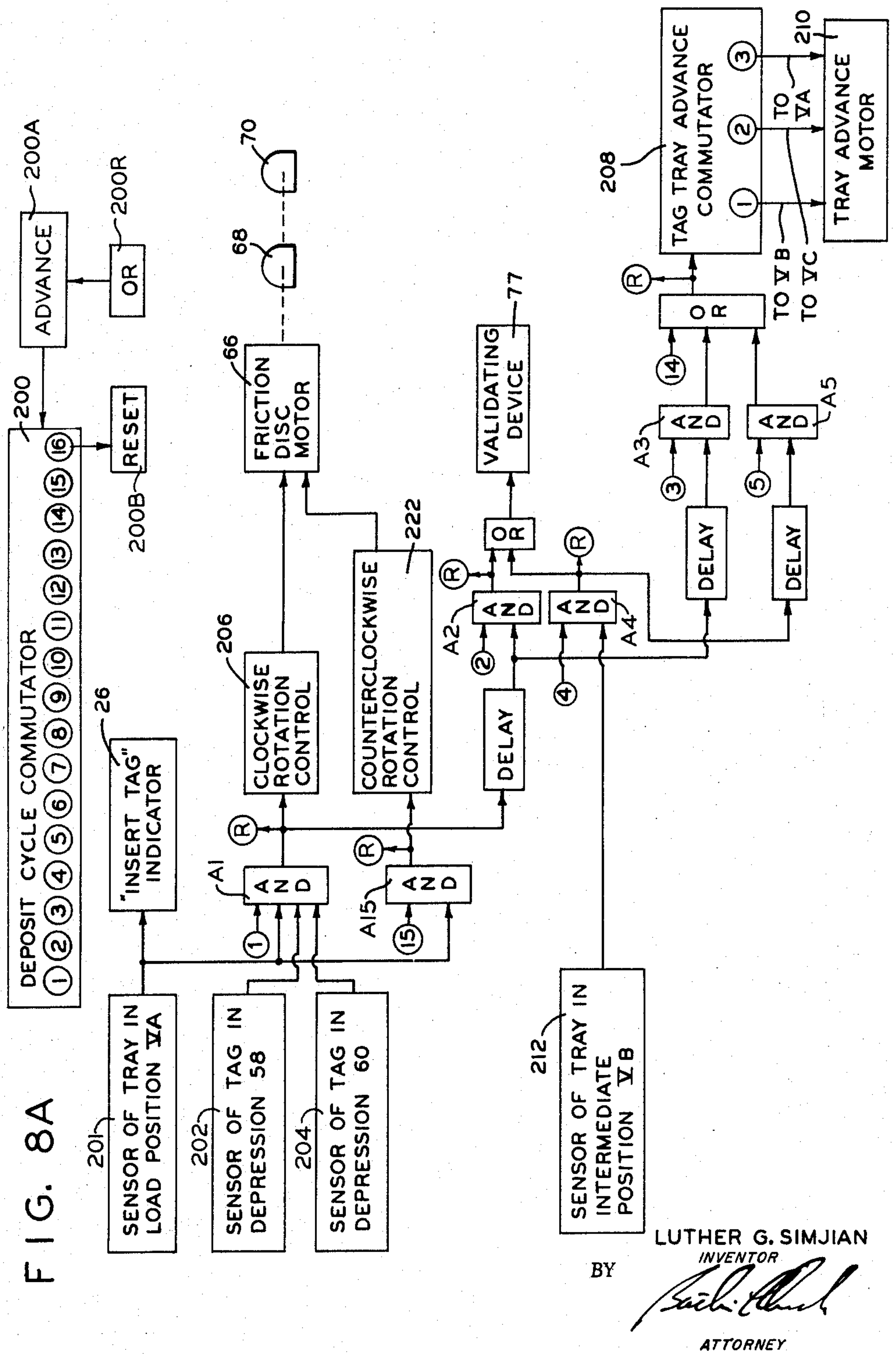
FIGURES 8A and 8B, taken in conjunction, are a schematic electrical circuit diagram of the interconnections between the various components of the machine.
Figure 8B:
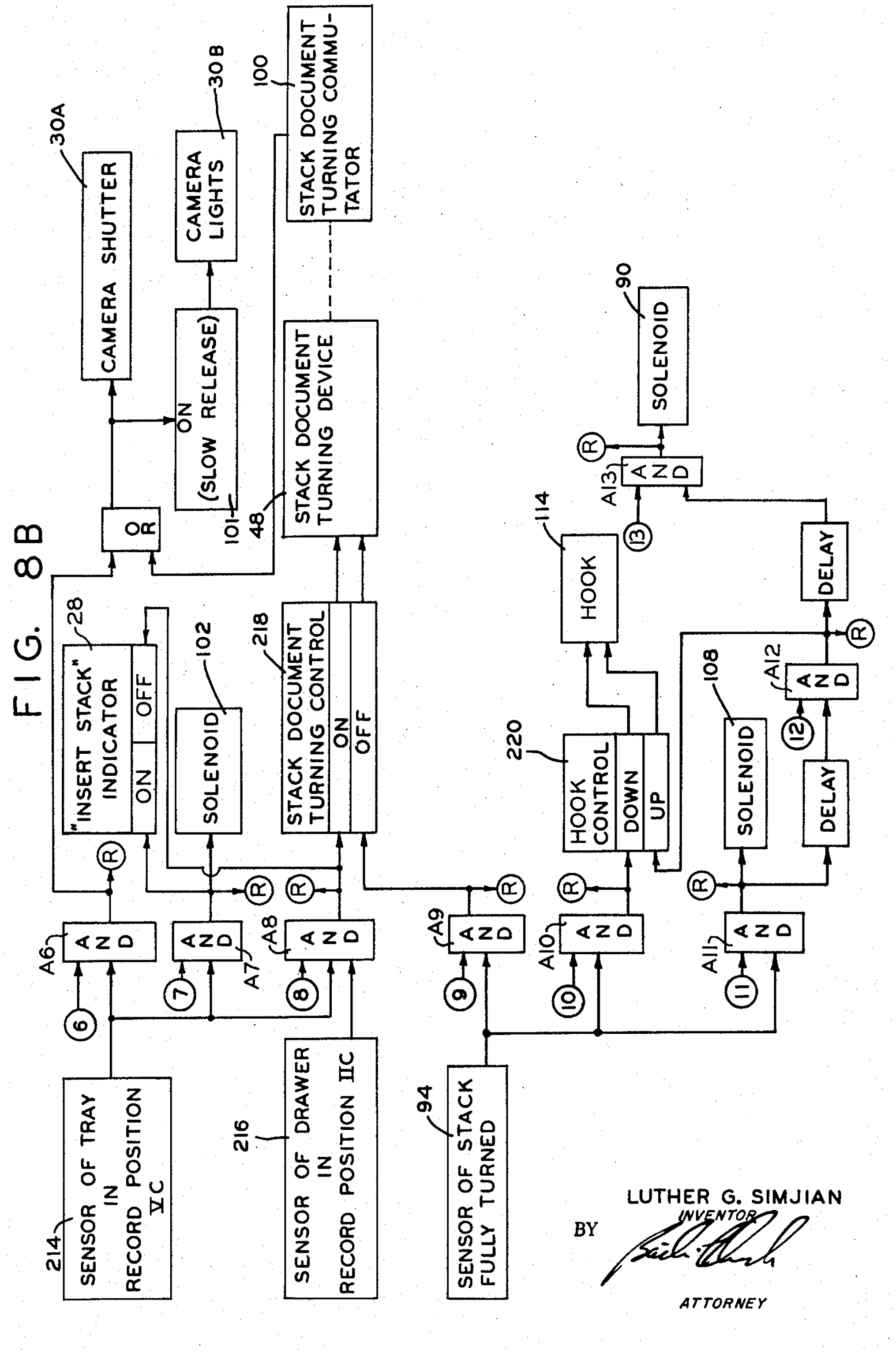

As seen in FIGURE 7, the stack clamp 40 is biased upwardly towards the document turning device 48, carrying the stack of documents 22, which stack may include money bills and other documents, into cooperative relationship with the hollow projections 52. Each of the projections 52 is mounted for individual rotation with respect to the turret base 50, and for each 360 degrees of rotation of the base with respect to the stack clamp, each projection undergoes 360 degrees of rotation with respect to the base. This conjunctive rotation is accomplished by a planetary gear system (not shown) within the turret base 50. By this arrangement the orifice 54 of each projection 52 is also rotated. As each projection 52 reaches its document engage position, e.g., projection 52A in FIGURE 7A, its orifice, e.g., 54A, is directed perpendicularly towards the stack of documents 22. The topmost document, e.g., 22A, is gripped by the projection 52A by means of the vacuum developed at its orifice 54A and is pulled up and away from the stack, as shown in FIGURE 7B. When the next projection, e.g., 52B, reaches the stack it grips the new topmost document, e.g., 22B, and pulls it up and away from the stack, as shown in FIGURE 7C. As shown in FIGURE 7D, as each projection, e.g., 52A, rotates away from the stack, it eventually releases its document, e.g., 22A. However, the following projection, e.g., 52B, has previously come under the released document, e.g., 22A, and holds it away from the stack. As the document turning device 48 rotates, the free portion of each document in the stack 22 is turned away from the stack until the stack is fully turned as shown in FIGURE 7E. At this point, a sensing device, shown in FIGURE 8 as a photoelectric sensor 94, senses the uncovered base member 42 and turns off the power and vacuum supply for the document turning device.

As seen in FIGURES 7D and 2, a pair of mirrors 96 and 98, are provided to present a view to the camera 30 of that portion of the topmost document which is not held by the top member 44 of the stack clamp 40. As each projection first engages the topmost document the widest field of view of this topmost document is obtained, and at this time a commutator 100, shown in FIGURE 8, which is mechanically coupled to the turret base 50, triggers the shutter of the camera 30 to photograph the exposed portion of the document. A slow to release device 101, which is coupled to the camera shutter circuitry, turns on suitable lights for the camera. If desired, additional mirrors, not shown, may be provided to present a view of a portion of the rear of the document immediately preceding the topmost document, i.e., the document which has most recently been turned.

During this process of exposing each document, turning it and recording each of the documents in the stack 22, the stack has been held by the stack clamp 40, precluding any change of the interrelationship among the documents forming the stack.

Figure 5A:
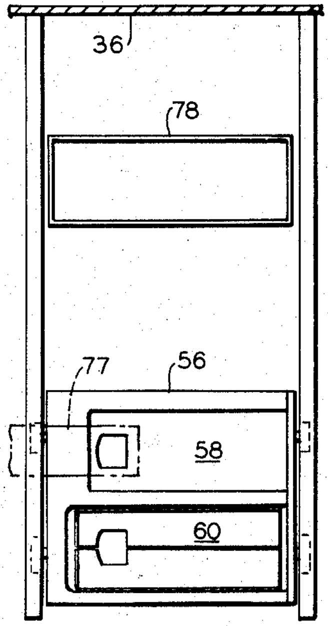
FIGURES 5A, 5B and 5C are an operation sequence strip showing the several positions of the deposit tag receiving tray.
Figure 5B:
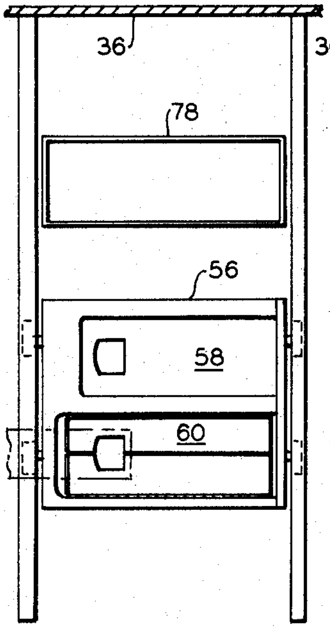
Figure 5C:
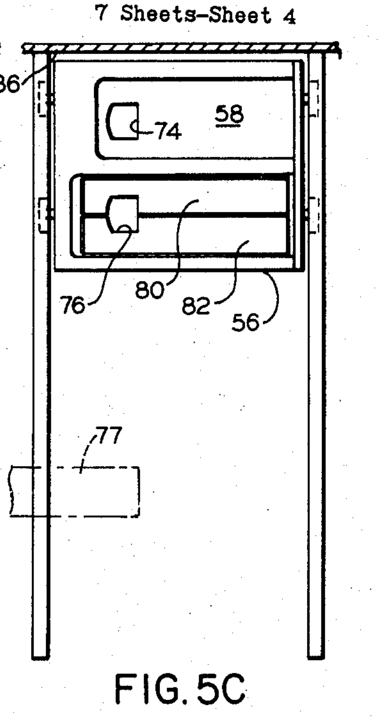
Figure 6A:
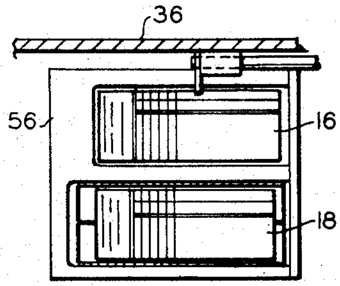
FIGURES 6A, 6B, 6C, 6D, 6E and 6F are an operation sequence strip showing in conjunction the several positions of the deposit tag receiving tray and the stack carrier and document turning devices.
Figure 6B:
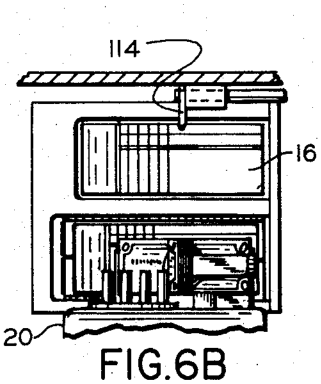

The overall scheme of operation of the machine is shown in FIGURES 5A, 5B and 5C, 6A through 6F, and 8. The timing of the operations is controlled by a commutator 200. The commutator 200 is advanced by an advance mechanism 200A which is actuated by an OR gate 200R having inputs shown as R circled. The commutator 200 has sixteen sequentially energized outputs shown as circled numbers 1 through 16. Output 16 actuates a reset mechanism 200B which resets the commutator to energize output 1. The deposit tag tray 56 is initially in its load position VA, shown in FIGURES 5A and 2, which is sensed by a sensor 201. The stack drawer 20 is in its normal position IIA, and is held therein by a solenoid 102 having a plunger 104 which engages a notch 106 in the underside of the drawer. The "insert tag" indicator 26 is on. When the depositor has inserted his deposit tags through apertures 12 and 14, and the presence of a deposit tag is sensed by sensors 202 and 204 in the depressions 58 and 60 respectively of the tray 56, which is still in the load position VA, a clockwise rotation control 206 is actuated by an AND gate A1 to energize the friction disc motor 66, which rotates the friction discs 68 and 70 clockwise to insure that the tags are fully seated in the depressions. Then the validating device 77 is actuated by AND gate A2 to validate the tag 16 lying in the depression 58. A tag tray advance commutator 208 is then actuated by AND gate A3 to energize a tray advance motor 210 to move the tray 56 to its intermediate position VB, shown in FIGURE 5B, which is sensed by a sensor 212. The validating device 77 is then actuated by AND gate A4 to validate the tag 18 lying in the depression 60. The tray 56 is then moved to its record position VC by the commutator 208 and motor 210, which are actuated by AND gate A5. Position VC of the tray is sensed by a sensor 214. The shutter 30A of the camera 30, and the camera lights 30B are now actuated by AND gate A6 to photograph both tags in the tray 56 in FIGURE 6A. AND gate A7 now turns on the "insert deposit" indicator 28, and actuates the solenoid 102 to release the drawer 20. The depositor pulls the drawer 20 forwardly to its load position IIB, and inserts his stack of documents into the stack clamp 40. The depositor then pushes the drawer rearwardly against a compression spring 107 to its turning-record position IIC, which is sensed by a sensor 216. The drawer is held in position IIC by a solenoid 108 having a plunger 110 engaging the notch 106, and a handle 112 on the drawer 20 abuting the upper front wall 34A of the enclosure. The stack of documents is now held over the previously validated tag 18 in the depression 60, as shown in FIGURE 6B. The presence of tray 56 and the drawer 20 in their record positions as shown in FIGURE 6B, actuates, via AND gate A8 and a stack turning control 218, the document turning device 48 and commutator 100 which turn and record each document in the stack 22. It will be seen that each photograph includes an image of the exposed portion of the document prior to its being turned, an image of a portion of the tag 18 in the depression 60, and an image of all of the tag 16 in the depression 58. By this arrangement, each document is uniquely and completely identified with the specific deposit transaction.

Figure 6C:
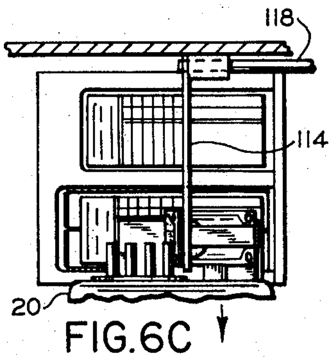
Figure 6D:
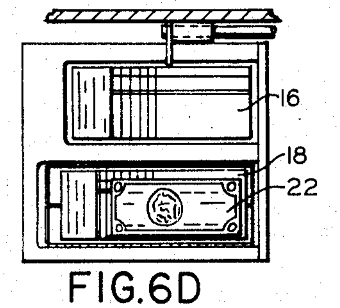
Figure 6E:
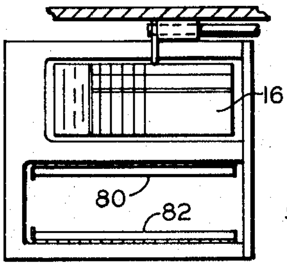
Figure 6F:
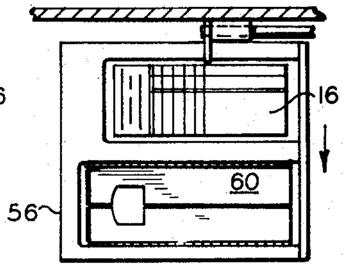

When the end of the turning operation is sensed by the sensor 94, the turning device 48 is turned off by AND gate A9; and an L-shaped hook 114, which is fixed to a shaft 118, is lowered via AND gate A10 and a hook control 220, as shown in FIGURE 6C. The solenoid 108 is then energized by AND gate A11 releasing the drawer 20, which is restored by the compression spring 107 to its normal position IIA and engaged by the plunger 104. As the drawer is moved from its record position IIC to its normal position IIA, the hook 114 restrains the stack of documents 22, which is pulled from the stack clamp 40, and falls on top of the tag 18 in the depression 60, as shown in FIGURE 6D. The hook 114 is then rotated via AND gate A11 and the hook control 220 to its up position, and then the solenoid 90 is actuated by AND gate A13 which lowers the plunger 88 to open the hinged flaps 80 and 82 of the depression 60, dropping the tag 18 and the stack 22 into the storage box 78 below, as seen in FIGURE 6E. When the solenoid 90 is deactuated the flaps 80 and 82 are restored. The commutator 200 is now at position 14 which actuates the tag tray advance commutator 208 and the tray advance motor 210 to move the tray 56 to its load position VA, as shown in FIGURES 5A and 2, which is sensed by sensor 204. A counterclockwise rotation control 222 is actuated by AND gate A15 to energize the motor 66 for counterclockwise rotation, to cause the friction disc 68 to kick the tag 16 in the depression 58 out through the aperture 12 to the depositor. It may be noted that this tag has been validated, and has been recorded with each item of the deposit and provides the depositor with a receipt of the transaction. The commutator 202 now resets, and the machine is ready to service the next depositor.

It will be appreciated that various modifications of the disclosed embodiment are within the scope of the invention.

If it is not desired to return a receipt to the depositor, then the tray 56 is omitted and a deposit tag is included in the stack of documents inserted into the stack clamp 40. If the tag is placed as the topmost or bottommost document in the stack, it will also serve as a spacer in the camera record strip. This method, however, will not provide an image of the deposit slip in each frame with an image of the other deposit documents.

Alternatively, the tray is retained and a single deposit tag is inserted in the tray depression 60. This will provide the duel images of a tag and a document in each frame.

Another alternative is to omit the tray 56 and to include a transaction counter and receipt issuing device. In this case, a counter which advances the displayed number for each deposit transaction is placed in view of the camera. This number is then recorded in each image together with the turned document. A receipt issuing device, such as is disclosed in my copending application entitled "Receipt Giving Machine," Serial No. 75,065, filed December 7, 1960, is actuated to issue a receipt bearing the same number as that which is displayed to the camera.

An additional alternative is to pivotally mount the stack clamp 40 with respect to the drawer 20 and the stack turning device 48 so that the clamp will initially present one end of the stack of documents 22 to the device 48 and the view of the camera 30, and is then subsequently pivoted to present the other end of the stack 22. By this arrangement almost the entire face of each document may be recorded.

Although the particular stack turning device described herein has been of the type manufactured by De La Rue Instruments, Ltd., the invention is not limited to the particular structure thereof, as any mechanism which will sequentially expose at least a portion of each document in a stack for recording while maintaining the integrity of the stack is comprehended within the scope of the instant invention.

I have thus shown and described my invention, but I desire it to be understood that it is not confined to the particular forms or usages shown and described, the same being merely illustrative, and that my invention may be carried out in other ways without departing from the spirit of my invention, and, therefore, I claim broadly the right to employ all equivalent instrumentalities coming within the scope of the appended claims, and, by means of which, objects of my invention are attained and new results are accomplished, as it is obvious that the particular embodiments herein shown and described are only some of the many that can be employed to attain these objects and to accomplish these results.

What is claimed is:

1. In a depository machine, the combination of
an enclosure;
image recording means for viewing documents disposed within said enclosure;
means for receiving a plurality of documents in a stack from without said enclosure and disposing the stack of documents within said enclosure;

means for engaging the stack and for sequentially exposing a portion of each of the documents in the stack in the view of said recording means while the documents are maintained in the stack;

control means coupled to said recording means and said engaging means for actuating said recording means in synchronism with said engaging means to record an image of each exposed portion of the documents.

2. A combination according to claim 1 wherein said receiving means includes means for holding the stack of documents in its stacked relationship.

3. A combination according to claim 1 further including means for transporting the stack out of the view of said image recording means;

said control means coupled to said transporting means for actuating said transporting means after the documents of the stack have been recorded.

4. A combination according to claim 1 further including storage means for receiving and storing the stack of documents;

means for transporting the stack out of the view of said image recording means to said storage means;

said control means coupled to said transporting means for actuating said transporting means after the stack has been recorded to dispose the stack in said storage means.

5. A combination according to claim 1 further including means for receiving an additional document from without said enclosure and disposing the additional document in the view of said recording means;

said control means also coupled to said additional document receiving means for actuating said recording means to record the additional document.

6. A combination according to claim 1 further including means for receiving an additional document from outside said enclosure;

said control means including means for sensing the presence of an additional document within said enclosure;

said means for receiving the stack of documents being normally inoperable;

said control means, upon sensing the presence of an additional document within said enclosure, rendering operable said receiving means for receiving a stack of documents.

7. A combination according to claim 1 further including means for receiving an additional document from without said enclosure and disposing the additional document in the view of said recording means;

said means for receiving the stack of documents being normally inoperable;

said control means including means for sensing the presence of the additional document in the view of said recording means;

said control means, upon sensing the presence of an additional document in the view of said recording means, actuating said recording means to record said additional document, and rendering operable said receiving means for receiving a stack of documents.

8. A combination according to claim 1 further including means for receiving an additional document from outside said enclosure and disposing the additional document in the view of said recording means;

whereby said recording means concurrently records an image of the additional document with each image of the exposed portion of the documents of the stack.

9. A combination according to claim 1 further including means inside said enclosure for dispensing a receipt without said enclosure.

10. A combination according to claim 1 further including means within said enclosure for holding an additional document and for issuing the additional document as a receipt.

11. A combination according to claim 1 further including means inside said enclosure for validating a receipt inserted into said enclosure and returning the validated receipt without said enclosure.

12. A combination according to claim 1 further including means inside said enclosure for receiving an additional document, for validating and recording the additional document, and for returning the validated and recorded additional document without said enclosure.

13. A combination according to claim 1 further including means inside said enclosure for receiving an additional document and for transporting the additional document to a certain position and in the view of said image recording means;

means for validating the additional document at said given position;

said control means coupled to said additional document receiving means, said validating means and said image recording means, for actuating said additional document receiving means to transport said additional document to said given position and in the view of said camera, for actuating said validating means to validate the additional document when it is at said given position, and for actauting said image recording means to record an image of the additional document when it is in the view of said image recording means.

14. A combination according to claim 1 wherein said means for engaging and sequentially exposing a portion of each of the documents in the stack includes means for concurrently exposing a portion of the front of each of the documents and a portion of the rear of the respective preceding document in the view of said recording means.

15. A combination according to claim 1 wherein said means for engaging and sequentially exposing a portion of each of the documents in the stack is adapted to initially engage one end of the stack and to expose portions of documents therein and to subsequently engage the other end of the stack and to expose portions of documents therein.

16. In a depository machine for documents such as money bills, checks and the like, the combination of:

an enclosure;

image recording means for viewing documents disposed within said enclosure;

means for receiving a plurality of documents of the type of the group including money bills and checks in a stack from without said enclosure and disposing the stack of documents within said enclosure;

means for engaging the stack and for sequentially exposing a portion of each of the documents in the stack in the view of said recording means while the documents are maintained in the stack;

means for receiving an additional document of the type of a deposit tag from without said enclosure and disposing the additional document within said enclosure at a given position and in the view of said recording means;

means for validating the additional document at said given position;

control means, including means for determining the presence of an additional document in said given position, and means for determining the presence of the additional document in the view of said recording means, said control means being coupled to said image recording means, said stack receiving means, said stack engaging means and said additional document receiving means, for determining the presence of an additional document in said given position and subsequent thereto actuating said validating means to validate the additional document, for determining the presence of the additional document in the view of said recording means and subsequent thereto actuating said recording means to record an image of said additional document, and for actuating said engaging means in synchronism with said recording means to record an image of each exposed portion of the documents.

17. A combination according to claim 16 further including means coupled to said control means for returning the additional document without said enclosure;

said control means, subsequent to said validation and recording of said additional document and said recording of said stack of documents, actuating said returning means for returning the additional document without said enclosure.

18. A combination according to claim 16 wherein said recording means concurrently records an image of the additional document with each image of the exposed portion of the documents.

No references cited.